US012659460B2

(12) United States Patent 
Ye et al.

(10) Patent No.: US 12,659,460 B2 
(45) Date of Patent: Jun. 16, 2026

(54) SIMPLIFIED MULTI-HYPOTHESIS CROSS COMPONENT PREDICTION MODELS

(71) Applicant: Tencent America LLC, Palo Alto, CA (US)

(72) Inventors: Jing Ye, Palo Alto, CA (US); Xin Zhao, Palo Alto, CA (US); Liang Zhao, Palo Alto, CA (US); Han Gao, Palo Alto, CA (US); Madhu Peringassery Krishnan, Palo Alto, CA (US); Yushin Cho, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 122 days.

(21) Appl. No.: 18/802,273

(22) Filed: Aug. 13, 2024

(65) Prior Publication Data

US 2025/0247520 A1     Jul. 31, 2025

Related U.S. Application Data

(60) Provisional application No. 63/625,883, filed on Jan. 26, 2024.

(51) Int. Cl. 
H04N 19/105 (2014.01) 
H04N 19/159 (2014.01) 
(Continued)

(52) U.S. Cl. 
CPC ......... H04N 19/105 (2014.11); H04N 19/159 (2014.11); H04N 19/176 (2014.11); H04N 19/186 (2014.11); H04N 19/70 (2014.11)

(58) Field of Classification Search 
None 
See application file for complete search history.

(56) References Cited

U.S. PATENT DOCUMENTS 11,115,655 B2 * 9/2021 Zhang .................. H04N 19/103 
2018/0184103 A1 * 6/2018 Panusopone ........... H04N 19/96 
(Continued)

OTHER PUBLICATIONS

Luc N. Trudeau et al., "Predicting Chroma from Luma in AV1", IEEE, 2018 Data Compression Conference, Mar. 2018, 9 pgs. 
(Continued)

*Primary Examiner* — Mohammad J Rahman 
(74) *Attorney, Agent, or Firm* — Morgan, Lewis & Bockius LLP

(57) ABSTRACT

The various implementations described herein include methods and systems for coding video. In one aspect, a video bitstream includes a current coding block of an image frame and signals a syntax element for a multi-hypothesis cross-component prediction (MH-CCP) mode. The syntax element indicates whether to reconstruct a first chroma sample of the current coding block by combining a set of luma samples including a first luma sample based on a model having a plurality of model parameters. When the MH-CCP mode is enabled, a computing system determines a first subset of model parameters and a second subset of model parameters used in the MH-CCP mode for the current coding block successively. The computing system combines the first luma sample and a set of neighboring luma samples using the plurality of model parameters to generate the first chroma sample, and reconstructs the current coding block including the first chroma sample.

21 Claims, 8 Drawing Sheets

(51) Int. Cl.
   _H04N 19/176_ (2014.01)
   _H04N 19/186_ (2014.01)
   _H04N 19/70_ (2014.01)

(56) References Cited

U.S. PATENT DOCUMENTS

| | | | | |
|---|---|---|---|---|
| 2019/0320171 A1* | 10/2019 | Zhang | .................. | H04N 19/577 |
| 2021/0084304 A1* | 3/2021 | Schwarz | ................ | H04N 19/91 |
| 2021/0211673 A1* | 7/2021 | Schwarz | ............ | H04N 19/1887 |
| 2021/0329296 A1* | 10/2021 | Filippov | ............. | H04N 19/157 |
| 2021/0409683 A1* | 12/2021 | Chen | .................... | H04N 19/136 |
| 2022/0038681 A1* | 2/2022 | Galpin | ................ | H04N 19/176 |
| 2022/0159263 A1* | 5/2022 | Wang | .................. | H04N 19/132 |
| 2022/0279187 A1* | 9/2022 | Sim | ..................... | H04N 19/157 |
| 2024/0171748 A1* | 5/2024 | Bandyopadhyay | .. | H04N 19/132 |
| 2025/0247553 A1* | 7/2025 | Tsai | ..................... | H04N 19/463 |
| 2025/0386037 A1* | 12/2025 | Bordes | ................ | H04N 19/176 |

OTHER PUBLICATIONS

Peter de Rivas et al., "AV1 Bitstream & Decoding Process Specification", Version 1.0.0 with Errata 1, Alliance for Open Media, Codec Working Group, Jan. 2018, 681 pgs., Retrieved from the Internet: https://aomediacodec.github.io/av1-spec/av1-spec.pdf.
Yue Chen et al., "An Overview of Core Coding Tools in the AV1 Video Codec", 2018 IEEE Picture Coding Symposium (PCS), Jun. 2018, 5 pgs.

* cited by examiner

FIG. 1

Server System
112

$$predChromaVal = \sum_{i=0}^{Num} w_i \cdot S_i + w_p \cdot P + w_B \cdot B$$

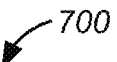

Receive a video bitstream including a current coding block of a current image frame, wherein the video bitstream includes a syntax element for a multi-hypothesis cross-component prediction (MH-CCP) mode. 702

Based on the syntax element, determine whether the MH-CCP mode is enabled to reconstruct a first chroma sample of the current coding block by combining a set of luma samples including a first luma sample based on a model having a plurality of model parameters, the first luma sample collocated with the first chroma sample. 704

When the syntax element indicates that the MH-CCP mode is enabled: 706

Determine a first subset of model parameters used in the MH-CCP mode for the current coding block. 708

After determining the first subset of model parameters, determine a second subset of model parameters used in the MH-CCP mode for the current coding block. 710

Identify a set of neighboring luma samples of the first luma sample. 712

Combine the first luma sample and the set of neighboring luma samples using the plurality of model parameters to generate the first chroma sample. 714

Reconstruct the current coding block including the first chroma sample. 716

FIG. 7

SIMPLIFIED MULTI-HYPOTHESIS CROSS COMPONENT PREDICTION MODELS

RELATED APPLICATIONS

This application claims priority to U.S. Provisional Patent Application No. 63/625,883, entitled "Simplified Multi-Hypothesis Cross Component Prediction Model," filed Jan. 26, 2024, which is hereby incorporated by reference in its entirety.

TECHNICAL FIELD

The disclosed embodiments relate generally to video coding, including but not limited to systems and methods for processing video data using multi-hypothesis cross-component prediction (MH-CCP).

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes video compression methods using intra prediction. A linear or nonlinear weighted sum of multiple versions of luma samples is used to predict a chroma sample, e.g., in multi-hypothesis cross-component prediction (MH-CCP). The multiple versions of luma samples includes a luma sample C that is co-located with the chroma sample and a filtered luma sample that is determined based on neighboring luma samples and applied as a filtering input. Each filtering input to a weighted sum is called a hypothesis. Each hypothesis is associated with a weighing factor in MH-CCP. In one aspect of the application, model parameters are applied to generate the linear or nonlinear weighed sum of different versions of luma samples. These model parameters are determined into multiple subsets, which are determined successively for each coding block based on a reference area of the respective coding block. In some embodiments, these model parameters are determined by applying a least mean square calculation kernel to process reconstructed samples of reference blocks of each coding block.

Stated another way, in some embodiments, a sample of a second color component is predicted as a linear or nonlinear weighted sum a sample of a first color component (which is collocated with the sample of the second color component) and one or more associated neighboring luma samples according to a multi-tap model associated with MH-CCP. The multi-tap model includes a number (N) of taps, which are selected from the collocated sample of the first color component, the one or more associated neighboring samples of the first color component, a nonlinear term, and an offset term. The multi-tap model corresponds to the same number (N) of selected terms combined to determine the sample of the second color component. Some implementations of this application are directed to arranging the model parameters used in MH-CCP into different subsets and determining the subsets model parameters successively.

In some embodiments, the sample of the first color component is a luma sample, and the sample of the second color component is a blue-difference chroma (Cb) sample or a red-difference chroma (Cr) component. For example, the chroma sample is a weighted combination of terms selected from a respective collocated luma sample, one or more neighboring luma sample, the nonlinear term, and the offset term. Alternatively, in some embodiments, the first color component is one of the red, green, and blue colors, and the second color component is another one of the one of red, green, and blue colors. Alternatively, in some embodiments, the first color component and the second component correspond to a color format that is distinct from a YCbCr color format and an RGB color format.

In accordance with some embodiments, a method of video decoding is provided. The method includes receiving a video bitstream including a current coding block of a current image frame. The video bitstream includes a syntax element for a multi-hypothesis cross-component prediction (MH-CCP) mode. The method further includes, based on the syntax element, determining whether the MH-CCP mode is enabled to reconstruct a first chroma sample of the current coding block by combining a set of luma samples including a first luma sample based on a model having a plurality of model parameters. The first luma sample is collocated with the first chroma sample. The method further includes, when the syntax element indicates that the MH-CCP mode is enabled, determining a first subset of model parameters used in the MH-CCP mode for the current coding block; after determining the first subset of model parameters, determining a second subset of model parameters used in the MH-CCP mode for the current coding block; identifying a set of neighboring luma samples of the first luma sample; and combining the first luma sample and the set of neighboring luma samples using the plurality of model parameters to generate the first chroma sample. The method further includes reconstructing the current coding block including the first chroma sample.

In accordance with some embodiments, a method of video encoding is provided. The method includes receiving video data comprising a current coding block of a current image frame, encoding the current image frame, and transmitting the encoded current image frame via a video bitstream. The method further includes signaling, via the video bitstream, a syntax element for an MH-CCP mode, indicating whether to reconstruct a first chroma sample of the current coding block combining a set of luma samples including a first luma sample based on a model having a plurality of model parameters. The first luma sample is collocated with the first chroma sample. When the MH-CCP mode is enabled, a first subset of model parameters and a second subset of model parameters are sequentially determined for use in the MH-CCP mode for reconstructing the current coding block.

In accordance with some embodiments, a method of bitstream conversion is provided. The method includes obtaining a source video sequence including a current coding block of a current image frame and performing a conversion between the source video sequence and a video bitstream. The video bitstream includes the current coding block of the current image frame and a syntax element for an MH-CCP mode. The syntax element for the MH-CCP mode indicates whether to reconstruct a first chroma sample of the current coding block combining a set of luma samples including a first luma sample based on a model having a plurality of model parameters. The first luma sample collocated with the first chroma sample. When the MH-CCP mode is enabled, a first subset of model parameters and a second subset of model parameters are sequentially determined for use in the MH-CCP mode for reconstructing the current coding block.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 7 is a flow diagram illustrating an example method of coding video, in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
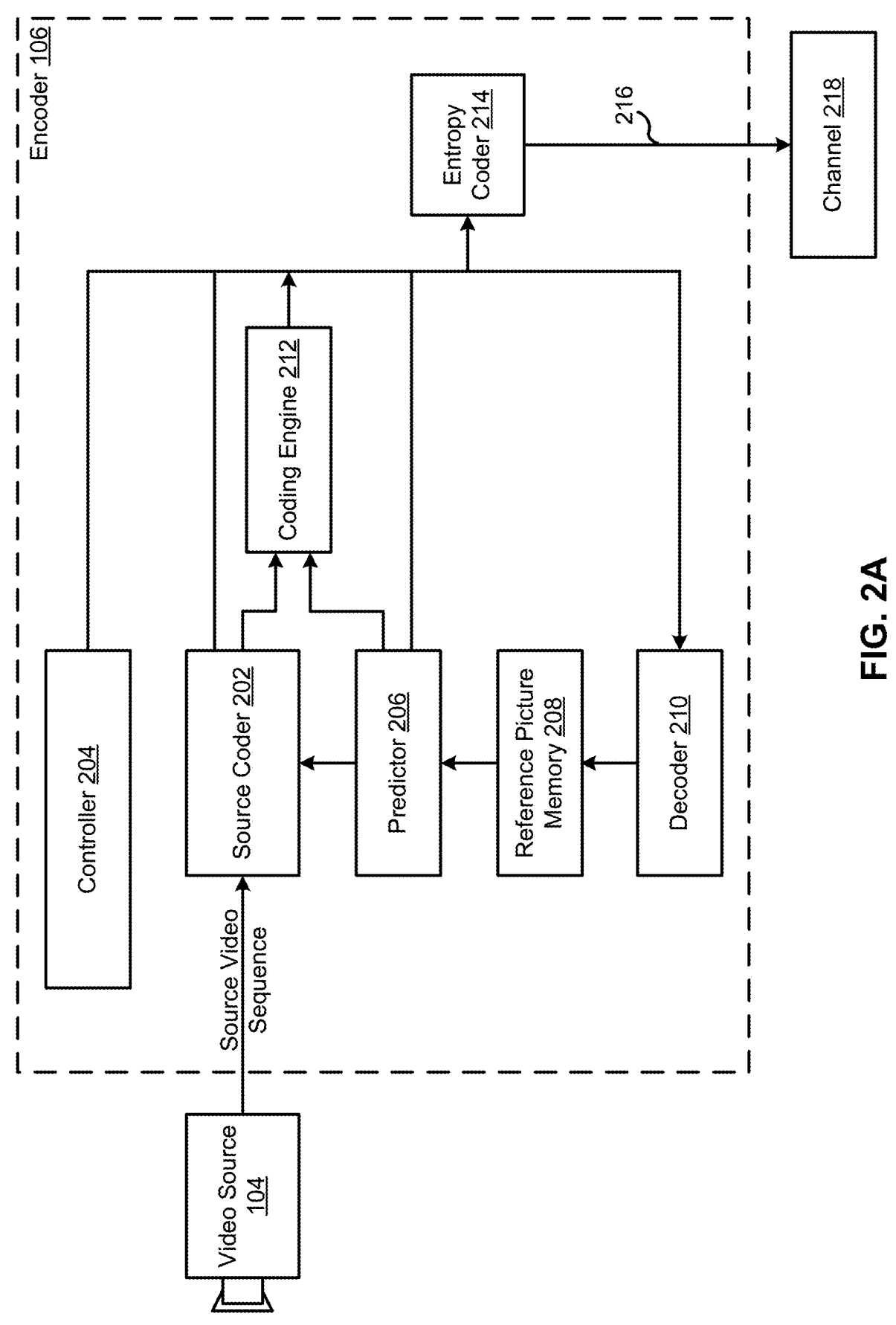
FIG. 2A is a block diagram illustrating example elements of an encoder component in accordance with some embodiments.

The present disclosure describes cross component intra prediction of video data in a MH-CCP mode where each of a plurality of samples of a second color component is determined based on one or more associated samples of a first color component. The MH-CCP mode corresponds to a multi-tap model that includes a number (N) of taps. Each tap is selected from a collocated sample of the first color component, the one or more associated neighboring samples of the first color component, a nonlinear term, and an offset term. The selected taps are combined in a weighted manner to determine the sample of the second color component. In some embodiments, the sample of the first color component is a luma sample, and the sample of the second color component is a chroma sample. For example, the chroma sample is a weighted combination of terms selected from a respective collocated luma sample, one or more neighboring luma sample, the nonlinear term, and the offset term. When the syntax element indicates that the MH-CCP mode is enabled, a first subset of model parameters and a second subset of model parameters are successively determined for use in the MH-CCP mode for the current coding block. In the MH-CCP mode, samples of the second color component of a current coding block do not need to be transmitted in a video bitstream, thereby conserving a communication bandwidth of a video codec. Additionally, the MH-CCP involves 2 levels of combinations can provide a high level of accuracy for sample values compared with a single level of combination. Additionally, when the model parameters of the MH-CCP mode are determined in subsets, they can be determined in a fast rate and with a high accuracy level.

Figure 1:
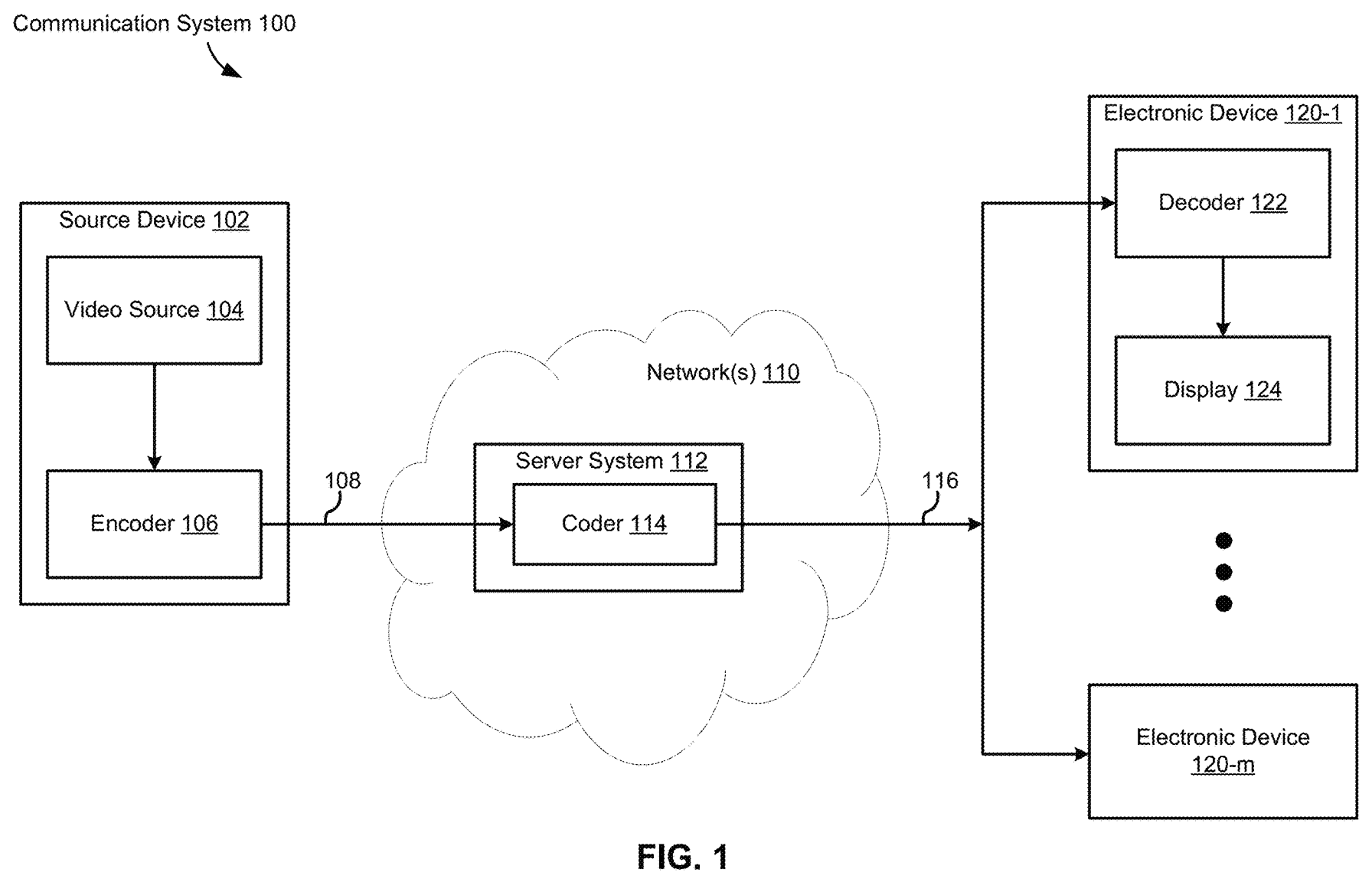

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
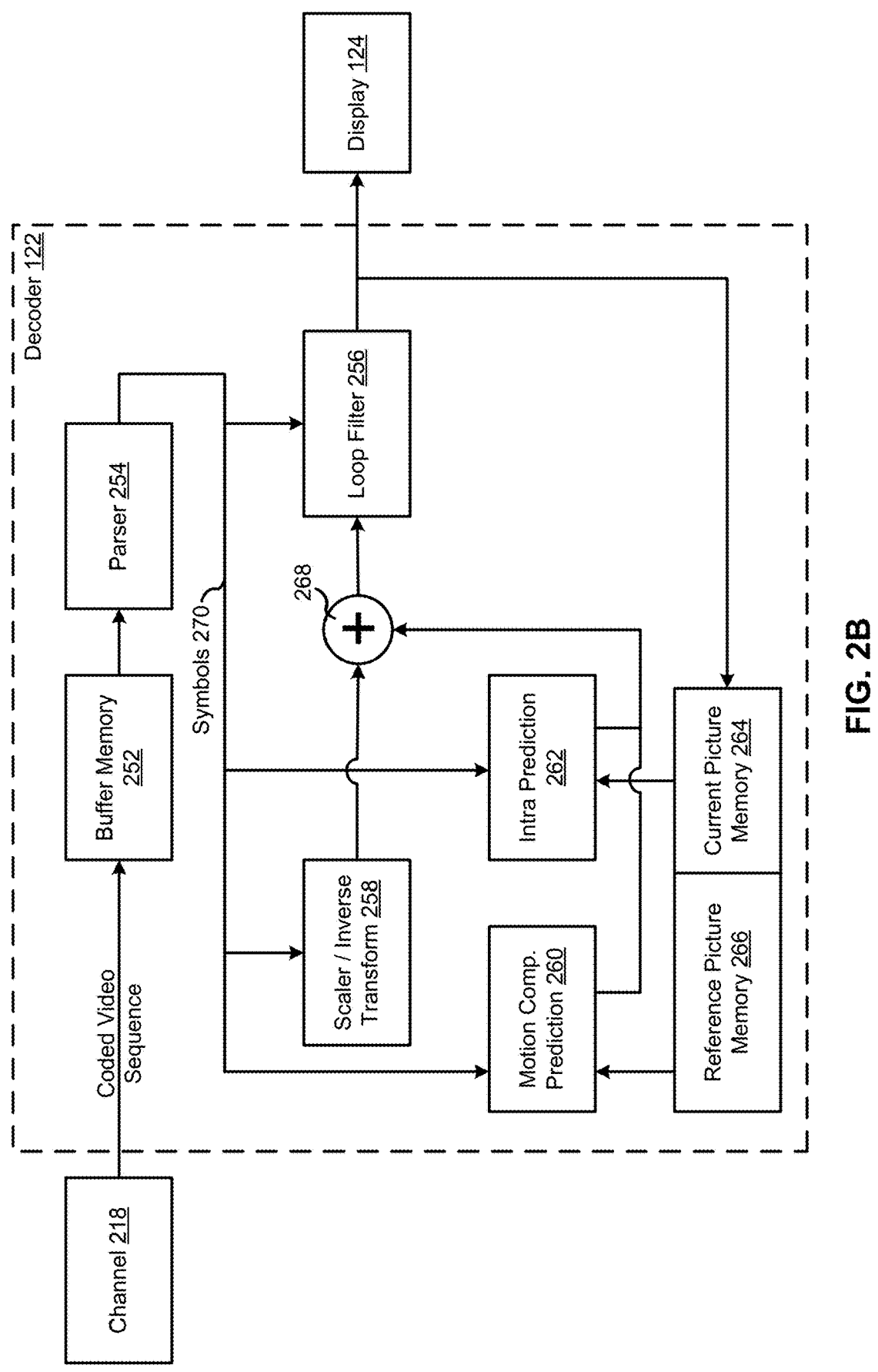
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
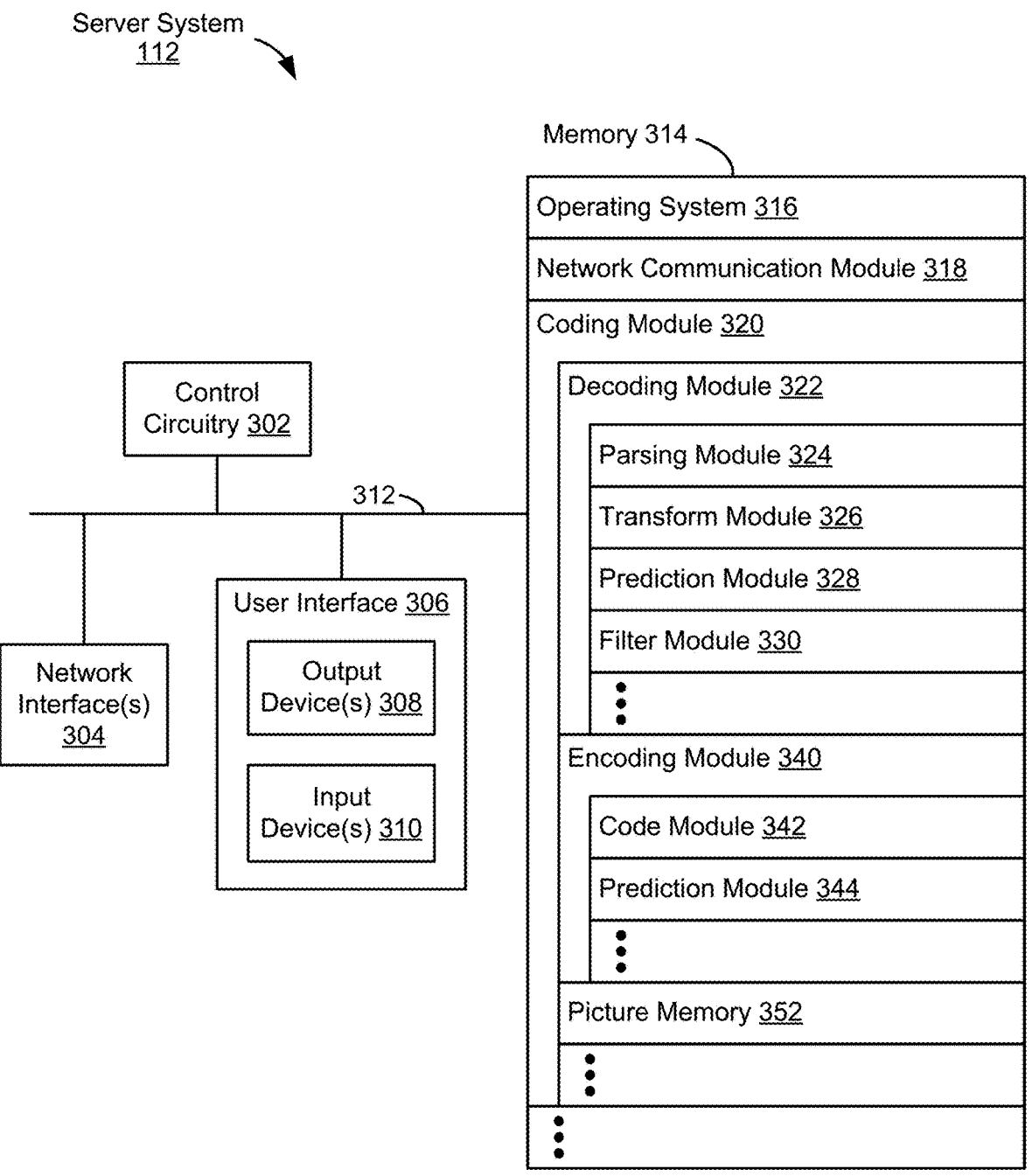
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
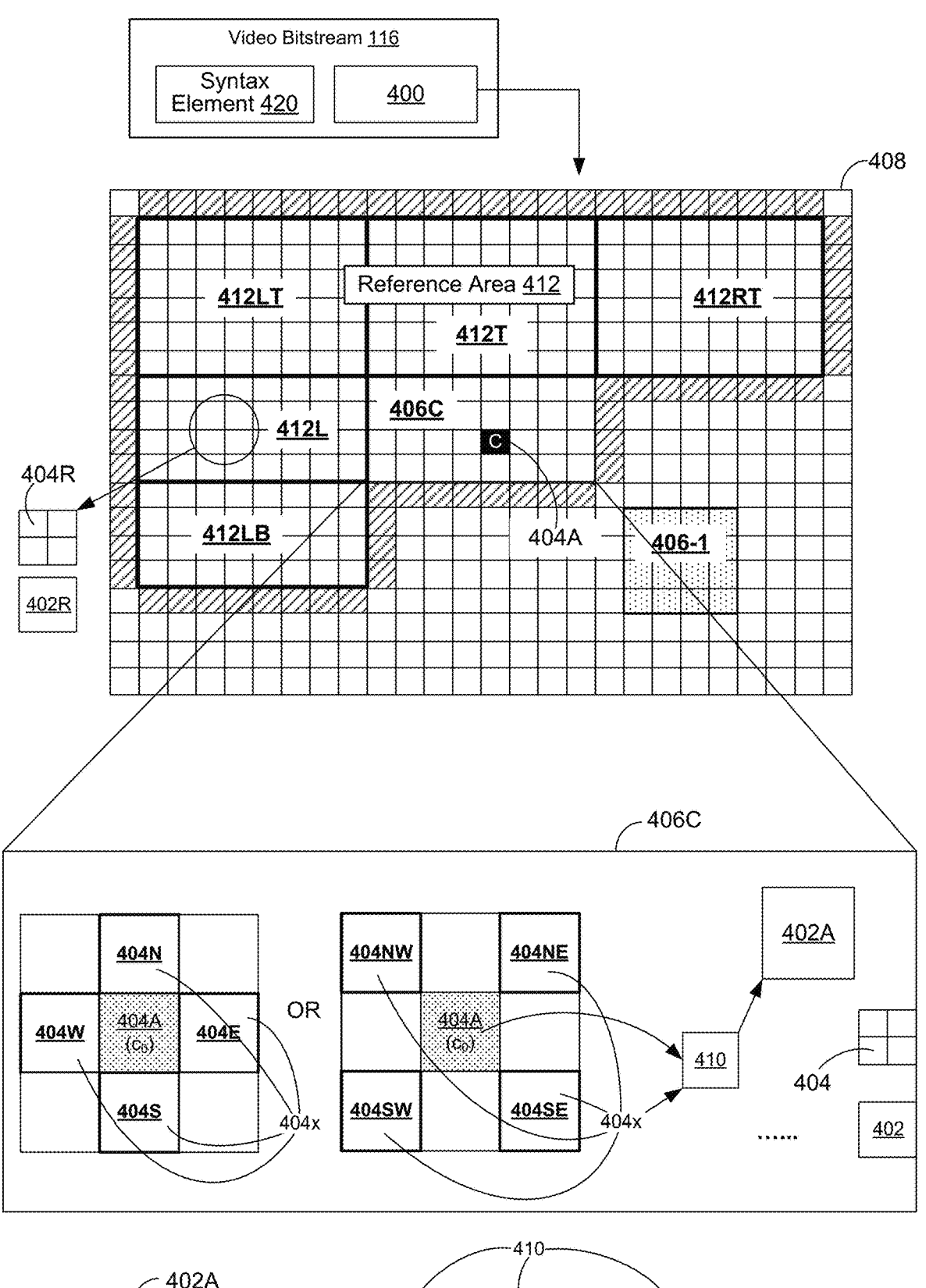
FIG. 4 illustrates an example scheme for generating a first chroma sample from a plurality of luma samples in an MH-CCP mode, in accordance with some embodiments.

FIG. 4 illustrates an example scheme 400 for generating a first chroma sample 402A from a plurality of luma samples 404 (e.g., 404A and 404X) in an MH-CCP mode, in accordance with some embodiments. In some embodiments, a current coding block 406C of a current image frame 408 is coded in a cross-component intra prediction (CCIP) mode. In the CCIP mode, a decoder 122 (FIG. 2B) determines each of a plurality of chroma samples 402 of the current coding block 406C based on one or more luma samples 404 that have been reconstructed. In some situations, the CCIP mode includes a cross-component linear model mode (CCLM) in which a first chroma sample 402A is converted from a reconstructed luma sample 404A that is co-located with the chroma sample 402A based on a linear model. Alternatively, in some situations, the CCIP mode includes a convolutional cross-component mode (CCCM) in which a first chroma sample 402A is predicted directly from a plurality of reconstructed luma samples 404X that is located adjacent to the first luma sample 404A based on a filter shape of a filter. Alternatively and additionally, in some situations, the CCIP mode includes the MH-CCP mode in which a first chroma sample 402A is generated by combining at least the first luma sample 404A that is collocated with the first chroma sample 402A and a plurality of hypothesis values using a plurality of weighing factors. The plurality of neighboring luma samples 404X of the first luma sample 404A are combined using a plurality of coefficients to generate the plurality of hypothesis values.

In other words, in some embodiments associated with the MH-CCP mode, the first luma sample 404A and the plurality of neighboring luma samples 404X are combined using a plurality of model parameters 410 (which are associated with the weighing factors and the coefficients) to generate the first chroma sample 402A. The first chroma sample 402A is a blue-difference chroma (Cb) sample or a red-difference chroma (Cr) component. In some embodiments, a video bitstream 116 includes the current coding block 406C of the current image frame 408 and a syntax element 420 for the MH-CCP mode. The syntax element 420 indicates whether to reconstruct the first chroma sample 402A of the current coding block 406C by combining a set of luma samples 404 including a first luma sample 404A based on a plurality of model parameters 410.

In some embodiments, a video bitstream 116 includes a syntax element 420 for the MH-CCP mode. The first chroma sample 402A of the current coding block 406C is configured to be generated by combining at least the first luma sample 404A that is co-located with the first chroma sample 402A and one or more neighboring luma samples 404X of the first luma sample 404A using a plurality of model parameters (e.g., $w_i$, $w_P$, $w_B$). In accordance with a determination that the MH-CCP mode is applied, the first chroma sample 402A is predicted according to the following model:

$$predChromVal = \sum_{i=0}^{Num} w_i \cdot S_i + w_p \cdot P + w_B \cdot B \qquad (1)$$

where predChromaVal is a predicted chroma value of the first chroma sample 402A; Num is a total number of neighboring luma samples 404X; $S_i$ is a luma value of the first luma sample 404A (where i is equal to 0) or a neighboring luma sample 404X (where i is greater than 0), which is indexed by i; P is a nonlinear term; B is an offset term; and $w_i$, $w_P$, $w_B$ are model parameters. In an example, the nonlinear term P is equal to equal to (C×C+B)>>bit_depth, where bit_depth is the number of bits needed to represent luma samples of the current image frame 408 during encoding and decoding. In some embodiments, B is a median luma value, a middle luma value, or an average luma value of the luma samples 404 of the current coding block 406C. In another example, B is equal to 1<<(bit_depth−1).

In some embodiments, each of the one or more neighboring luma samples 404X of the first luma sample 404A is immediately adjacent to, and shares at least one respective side or vertex with, the first luma sample 404A. In some embodiments, the one or more neighboring luma samples 404X include a subset or all of a north neighboring luma sample (also called a top luma sample) 404N, a south neighboring luma sample (also called a bottom luma sample) 404S, a west neighboring luma sample (also called a left luma sample) 404W, an east neighboring luma sample (also called a right luma sample) 404E, a northwest neighboring luma sample (also called a top left luma sample) 404NW, a southeast neighboring luma sample (also called a bottom right luma sample) 404SE, a southwest neighboring luma sample (also called a bottom left luma sample) 404SW, and a northeast neighboring luma sample (also called a top right luma sample) 404NE.

In some embodiments, equation (1) includes five terms, and represents a five tap model for determining the first chroma sample 402A of the current coding block 406C based on three linear terms (e.g., associated with the first luma sample 404A and neighboring luma samples 404W and 404E), the nonlinear term P, and the offset term B in the MH-CCP mode. Alternatively, in some embodiments, equation (1) includes seven terms, and represents a seven tap model for determining the first chroma sample 402A of the current coding block 406C based on three linear terms (e.g., associated with luma samples 404A, 404W, 404E, 404N, and 404S), the nonlinear term P, and the offset term B in the MH-CCP mode.

In some embodiments, luma samples 404 and chroma samples 402 of the current coding block have different resolutions corresponding to a chroma subsampling scheme (e.g., 4:2:2 or 4:2:0). Each luma sample 404 includes a downsampled luma sample generated from reconstructed luma samples using a downsampling filter. Alternatively, in some embodiments, each luma sample 404 includes an original or reconstructed luma sample without any downsampling. That said, the first luma sample 404A is reconstructed according to a resolution of luma samples or downsampled to a resolution of chroma sample, so arc neighboring luma samples 404X (e.g., 404N, 404W, 404E, 404S, 404NW, 404NE, 404SW, 404SE) either reconstructed according to a resolution of luma samples or downsampled to a resolution of chroma sample.

In some embodiments, the plurality of model parameters $w_i$, $w_P$, and $w_B$ are determined based on a set of one or more reference luma samples 404R and a set of one or more co-located reference chroma samples 402R within a reference area 412 of the current coding block 406C. The reference area 412 is located in the current image frame 408. Further, in some embodiments, the reference luma samples 404R of the reference area 412 are combined to re-generate one or more chroma samples 402A based on equation (1). In some embodiments, the set of one or more co-located reference chroma samples 402R and the one or more re-generated chroma samples are compared to generate a least mean square (LMS) value. The plurality of model parameters $w_i$, $w_P$, $w_B$ are iteratively adjusted to reduce the LMS value, until the LMS value satisfies a predefined criterion (e.g., in which the LMS value is below a threshold LMS value or is minimized).

In some embodiments, the plurality of model parameters $w_i$, $w_P$, or $w_B$ are at least partially derived based on chroma samples and luma samples within the reference area 412 of the current coding block 406C, and the reference area 412 includes one or more coding blocks (e.g., coding blocks 412LT, 412T, 412RT, 412L, and 412LB) that are decoded prior to, the current coding block 406C. In some embodiments, a subset of the one or more coding blocks is immediately adjacent to the current coding block 406C. In some embodiments, a subset of the one or more coding blocks are separated from the current coding block 406C by one or more coding blocks. In some embodiments, the reference area 412 includes at least a portion of one or more rows above the current coding block 406C and/or a portion of one or more columns to the left of the current coding block 406C. For example, referring to FIG. 4, the reference area 412 includes seven rows of luma samples 404R above the current coding block 406C and nine columns of luma samples 404R to the left of the current coding block 406C. The reference area 412 may include a padded row and a padded column (e.g., shaded in FIG. 4).

Figure 5:
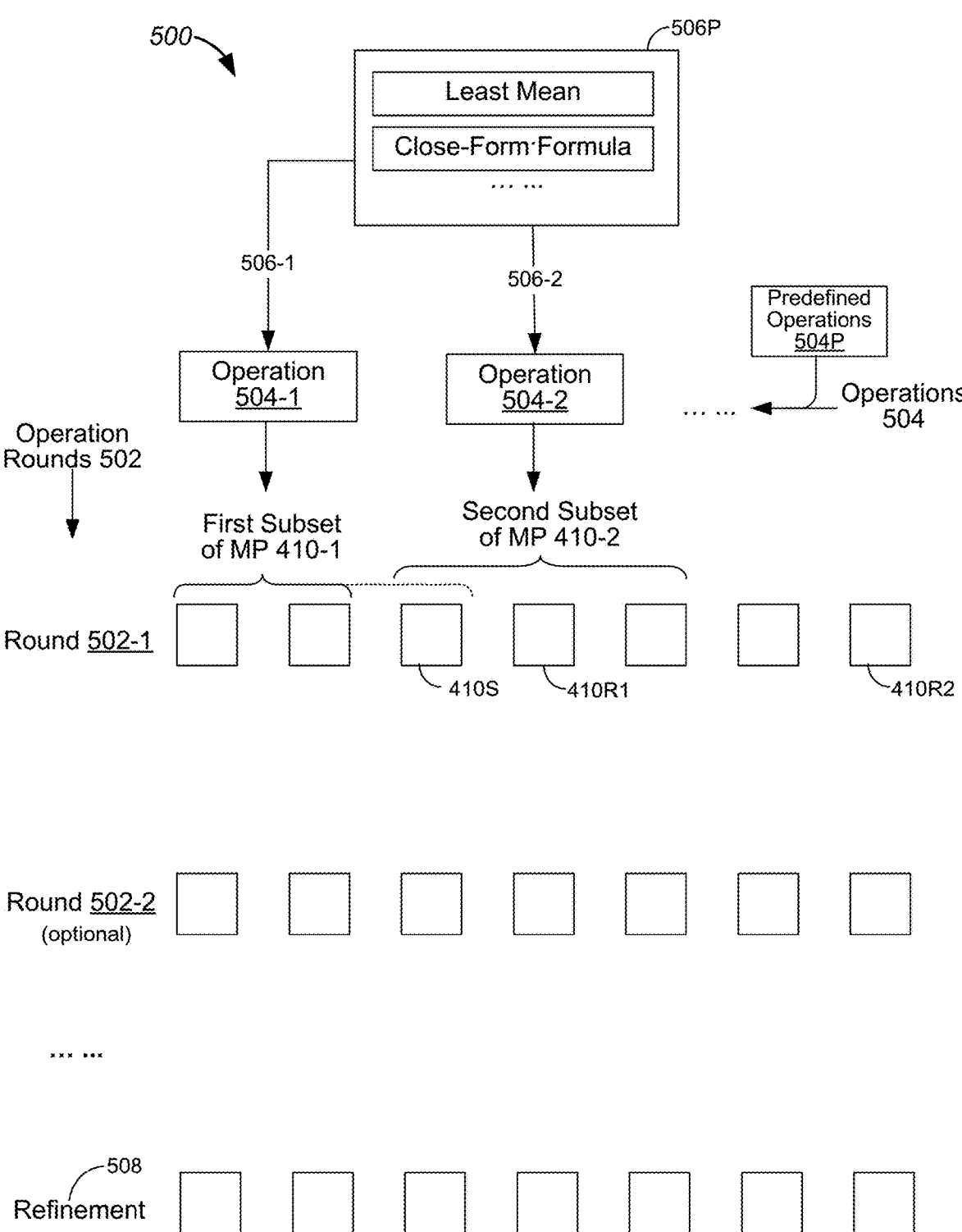
FIG. 5 illustrates an example process including one or more operation rounds of determining subsets of model parameters used in an MH-CCP mode, in accordance with some embodiments.

FIG. 5 illustrates an example process 500 including one or more operation rounds 502 of determining subsets of model parameters 410 used in an MH-CCP mode, in accordance with some embodiments. A computing system (specifically, a decoder 122 of an electronic device 120 in FIG. 1) receives a video bitstream 116 including a current coding block 406C of a current image frame 408. The video bitstream 116 includes a syntax element 420 for an MH-CCP mode, indicating whether the MH-CCP mode is enabled to reconstruct a first chroma sample 402A (FIG. 4) of the current coding block 406C by combining a set of luma samples 404 including a first luma sample 404A based on a model having a plurality of model parameters 410. The first luma sample 404A is collocated with the first chroma sample 402A. When the syntax element 420 indicates that the MH-CCP mode is enabled, the computing system determines a first subset of model parameters 410-1 to be used in the MH-CCP mode for the current coding block 406C. After determining the first subset of model parameters, the computing system determines a second subset of model parameters 410-2 used in the MH-CCP mode for the current coding block 406C. A set of neighboring luma samples 404X and the first luma sample 404A are determined, and combined using the plurality of model parameters 410 to generate the first chroma sample 402A. The computing system reconstructs the current coding block 406C including the first chroma sample 402A.

In some embodiments, when the syntax element 420 indicates that the MH-CCP mode is enabled, the computing system implements a plurality of operation rounds 502 for determining the plurality of model parameters 410. Each operation round 502 includes a plurality of operations 504. For a first operation round 502-1, the plurality of operations 504 includes a first operation 504-1 of determining the first subset of model parameters 410-1 and a second operation 504-2 of determining the second subset of model parameters 410-2. The second operation 504-2 follows the first operation 504-1. In some embodiments, each operation round 502 includes a respective subset of a plurality of predefined operations 504P, and each predefined operation 504P includes determining a respective subset of model parameters 410. Further, in some embodiments, the plurality of predefined operations 504P include the first operation 504-1 of determining the first subset of model parameters 410-1 and the second operation 504-2 of determining the second subset of model parameters 410-2. In an example, a predefined operation 504P includes determining the model parameters $w_i$ corresponding to all linear terms $S_i$ in equation (1), and is selected as the first operation 504-1 of determining the first subset of model parameters 410-1.

In some embodiments, the first operation round 502-1 includes all of the plurality of predefined operations 504P. In some embodiments, a second operation round 502-2 follows the first operation round 502-1, and includes less than all of the plurality of predefined operations 504P. In some embodiments, the first operation 504-1 of determining the first subset of model parameters 410-1 and the second operation 504-2 of determining the second subset of model parameters 410-2 are implemented in the same operation round (e.g., operation round 502-1). Conversely, in some embodiments not shown, the first operation 504-1 of determining the first subset of model parameters 410-1 and the second operation 504-2 of determining the second subset of model parameters 410-2 are implemented in two distinct operation rounds 502 (e.g., operation rounds 502-1 and 502-2). In some embodiments, two distinct operation rounds 502-1 and 502-2 includes operations 504 for determining different subsets of model parameters 410, i.e., no determination of a same single subset of model parameters is repeated in the operation rounds 502-1 and 502-2.

In some embodiments, a remaining model parameter 402R is distinct from each of the first subset of model parameters 510-1. While the first subset of model parameters 410-1 is being determined, the computing system sets the remaining model parameter 410R1 to a predefined parameter value. In an example, the predefined parameter value is equal to 0. In another example, the predefined parameter value is determined based on sample values of a reference coding block (e.g., in a reference area 412 in FIG. 4). In some situations, the model parameters 410 includes more than one remaining model parameter 410R1 in addition to the first subset of model parameters 410-1. While the first subset of model parameters 410-1 is being determined, the computing system sets all remaining model parameters 402R (e.g., including the second subset of model parameters 410-2) to their respective predefined parameter values.

In some embodiments, while determining the second subset of model parameters 410-2, the computing system sets a remaining model parameter 410R2 distinct from the second subset of model parameters 410-2 to a predefined parameter value. For example, the predefined parameter value is equal to 0 or determined based on sample values of a reference coding block of the reference area 412. Further, in some embodiments, at least one of the second subset of model parameters 410-2 (e.g., model parameter 410S) has been determined with the first subset of model parameters 410-1, and is set to a determined value while the second subset of model parameters 410-2 is being determined. Stated another way, the at least one of the first subset of model parameters is iteratively determined.

In some embodiments, the first subset of model parameters 410-1 include a model parameter $w_B$ of an offset term B. A DC value of a set of reference luma samples 404R of a reference area 412 and a DC value of a set of reference chroma samples 402R of the reference area 412 are applied to determine the model parameter $w_B$ of the offset term B. The set of reference chroma samples 402R are collocated with the set of reference luma samples 404.

In some embodiments, the first subset of model parameters 410-1 include a model parameter $w_B$ of an offset term B, and the second subset of model parameters 410-2 include a model parameter $w_P$ of a non-linear term P. The model parameter of the non-linear term P is determined based on the model parameter of the offset term B, which has been determined with the first subset of model parameters 410-1.

In some embodiments, the second subset of model parameters 410-2 include a model parameter $w_P$ of a non-linear term P, and the model parameter $w_P$ of the non-linear term P is determined to minimize f(x) as follows:

$$\min_x f(x) = \sum_{j=0}^{RefN} (w_p \cdot P_j - y_j)^2 \qquad (2)$$

where $y_j$ represents each of a set of reference chroma samples 404R indexed by j, RefN−1 is a total number of reference chroma samples 404R used to determine the model parameter $w_P$, and $P_j$ represents a non-linear term of one or more respective reference luma samples 402R corresponding to the respective reference chroma sample 404R of the reference area 412.

In some embodiments, the second subset of model parameters 410-2 includes at least one of the first subset of model parameters 410-1 (e.g., a shared model parameter 410S), and the at least one of the first subset of model parameters is iteratively determined. The first subset of model parameters 410-1 are determined based on a first parameter derivation method 506-1, and the second subset of model parameters are determined based on a second parameter derivation method 506-2 distinct from the first parameter derivation method 506-1. In some embodiments, the first parameter derivation method 506-1 is a least mean square method, and the second parameter derivation method 506-2 is a close-form formula based method. In some embodiments, the first parameter derivation method 506-1 and the second parameter derivation method 506-2 are two different method selected from a plurality of predefined parameter derivation methods 506P. Conversely, in some embodiments, both the first subset of model parameters 410-1 and the second subset of model parameters 410-2 are determined based on a common parameter derivation method (e.g., a least mean square method, a close-form formula based method).

In some embodiments, the current image frame 408 include a first coding block 406-1 distinct from the current coding block 406C. The first coding block 406-1 is reconstructed according to a chroma from luma (CfL) prediction mode associated with a CfL parameter derivation method. The first subset of model parameters 410-1 or the second subset of model parameters 410-2 is determined based on the CfL parameter derivation method (e.g., a least mean square method, a close-form formula based method).

In some embodiments, the first subset of model parameters 410-1 include a first number ($N_1$) of model parameters, and the second subset of model parameters 410-2 include a second number ($N_2$) of model parameters. The second number ($N_2$) is different from the first number ($N_1$).

In some embodiments, before using the plurality of model parameters 410, the computer system refines (operation 508) the plurality of model parameters 410 including the first subset of model parameters 410-1 and the second subset of model parameters 410-2 jointly.

In some embodiments, after the first subset of model parameters 410-1 is determined, the first subset of model parameters 410-1 is applied to determine the second subset of model parameters 410-2 used in the MH-CCP mode for the current coding block 406C. The first subset of model parameters 410-1 are iteratively determined.

In some embodiments, an ordered sequence of operations (e.g., corresponding to an operation round 502-1) is implemented to determine the plurality of model parameters 410 and includes at least determining the first subset of model parameters 410-1 and determining the second subset of model parameters 410-2) A total number (M) of operations in the ordered sequence of operations 504 is less than a total number (N) of model parameters of the plurality of model parameters 410. For example, the model parameters 410 include three linear model parameters $w_i$ for the luma samples 404A, 404W, and 404E, and a nonlinear model parameter $w_P$, and an offset model parameter $w_B$. The total number of model parameters is 5, and the total number (M) of operations is 2.

Figure 6:
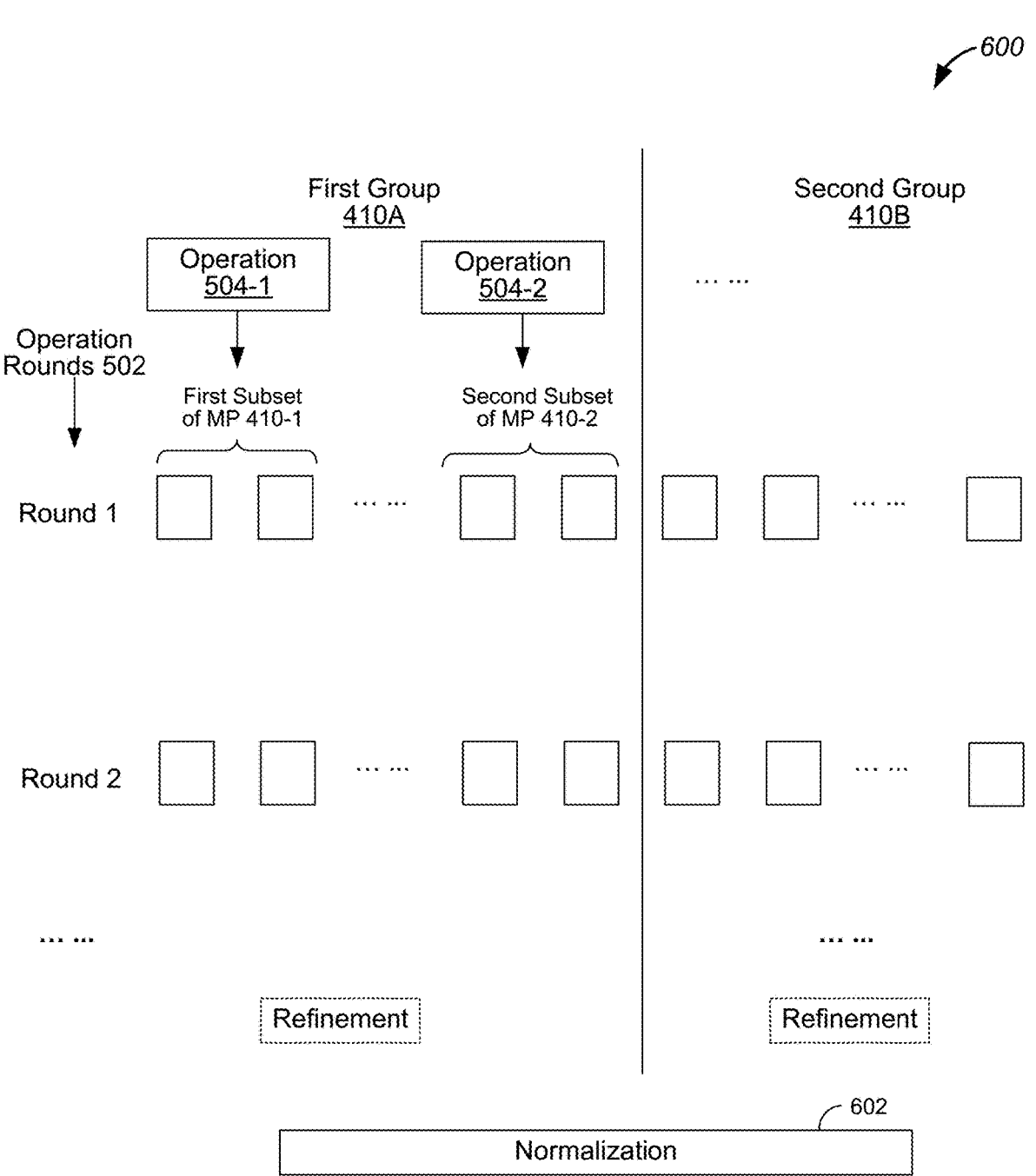
FIG. 6 illustrates an example process of determining two groups of model parameters used in an MH-CCP mode separately, in accordance with some embodiments.

FIG. 6 illustrates an example process 600 of determining two groups of model parameters 410A and 410B used in an MH-CCP mode separately, in accordance with some embodiments. A video bitstream 116 includes a current image frame 408 having a current coding block 406C and a syntax element 420 for an MH-CCP mode. The syntax element 420 indicates whether to reconstruct a first chroma sample 402A (FIG. 4) of the current coding block 406C by combining a set of luma samples 404 based on a model having a plurality of model parameters 410. A first luma sample 404A is collocated with the first chroma sample 402A. When the syntax element 420 indicates that the MH-CCP mode is enabled, a first subset of model parameters 410-1 and a second subset of model parameters 410-2 are successively determined for use in determination of the current coding block 406C. A set of neighboring luma samples 404X and the first luma sample 404A are determined, and combined using the plurality of model parameters 410 based on equation (1), thereby reconstructing the first chroma sample 402A.

In some embodiments, the plurality of model parameters 410 are split into a first group of model parameters 410A (e.g., $w_i$ in equation (1)) and a second group of model parameters 410B (e.g., $w_P$ and $w_B$ in equation (1)). The first group of model parameters 410A and the second group of model parameters 410 are separately determined. Stated another way, the first group of model parameters 410A is determined using a plurality of first operation rounds, and the second group of model parameters 410 is determined using a plurality of second operation rounds. In some situations, while the first group of model parameters 410A is determined using a plurality of first operation rounds, the second group of model parameters 410B are set to respective default values, and while the second group of model parameters 410B is determined using a plurality of second operation rounds, the first group of model parameters 410A are set to respective default values.

In some embodiments, the first group of model parameters 410A includes the first subset of model parameters 410-1 and the second subset of model parameters 410-2. The first subset of model parameters 410-1 and the second subset of model parameters 410-2 are successively determined for use in determination of the first chroma sample 402A in the MH-CCP mode. The first group of model parameters 410A and the second group of model parameters 410B are normalized (operation 602) before the plurality of model parameters 410 are applied to combine the first luma sample 404A and the associated neighboring luma samples 404X.

FIG. 7 is a flow diagram illustrating an example method 700 of decoding video, in accordance with some embodiments. The method 700 may be performed at a computing system (e.g., the server system 112, the source device 102, or the electronic device 120) having control circuitry and memory storing instructions for execution by the control circuitry. In some embodiments, the method 700 is performed by executing instructions stored in the memory (e.g., the memory 314) of the computing system. In some embodiments, the method 700 is applied jointly with one or more video codecs, including but not limited to, H.264, H.265/HEVC, H.266/VVC, AV1 and AVS/AVS2/AVS3. In some embodiments, a weighted sum of multiple versions of co-located luma samples 404A (FIG. 4) are used to predict the chroma values 402A in an MH-CCP mode. The multiple versions of co-located luma samples 404A are derived from either the co-located luma sample 404A, or the filtered co-located luma sample using neighboring luma samples 404X (e.g., 404W, 404N, 404E, 404S, 404NW, 404NE, 404SW, 404SE) as filtering inputs. Each input (e.g., corresponding a respective version of co-located luma samples) to the weighted sum is called a hypothesis. In some situations, values of reference luma samples 404R and reference chroma samples 402R are fed into the least mean square calculation kernel to derive model parameters 410 used in the MH-CCP mode. In some embodiments, a first luma sample 404A has eight neighbors 404X (FIG. 5) that are immediately adjacent to the first luma sample 404A. Further, in some embodiments, each luma sample 404 (e.g., 404A, 404X) includes a downsampled luma sample generated using a downsampling filter, when luma and chroma have different dimensions, e.g., 4:2:2 or 4:2:0. Alternatively, each luma sample 404 includes an original co-located luma sample without any downsampling.

Some implementations of this application include determining model parameters of MH-CCP in a plurality of operations 504. A subset of operations 504 may be implemented sequentially, forming an operation round 502. In each operation 504, a respective subset of model parameters 410 is determined. In some embodiments, a first subset of model parameters 410-1 is determined in the first operation 504-1, and a second subset of model parameters 410-2 is determined in the second operation 504-2.

In some embodiments, for each operation 504 of parameter derivation, remaining model parameters do not belong to the respective operation 504, and are set as a default value during the respective operation 504. For example, the default value is equal to zero or a value derived based on coding blocks that have been reconstructed in the current image frame 408. In an example, for the first operation 504-1 (FIG. 5), two associated remaining model parameters 410R1 and 410R2 are set to their respective default values.

In an example, the first subset of model parameters 410-1 of the first operation 504-1 includes a model parameter $w_B$ of the offset term B (e.g., without any other model parameter). A DC value of neighboring color channel samples (e.g., reference luma samples 404R, reference chroma samples 402R) can be the input and output of an MH-CCP model represented by equation (1).

In another example, the first subset of model parameters 410-1 of the first operation 504-1 includes a model parameter $w_P$ of the nonlinear term P (e.g., without any other model parameter). An estimated offset is determined based on reference luma samples 404R of the reference area 412, and can be an input. The model parameter $w_P$ of the non-linear term P is determined to minimize f(x) according to equation (2), where $y_i$ is a known reference chroma sample 402A in the reference area 412. In some situations, the model parameter $w_P$ of the non-linear term P is represented as follows:

$$w_P = \frac{\sum_{i=0}^{Num} y_i \cdot S_i^2}{\sum_{i=0}^{Num} S_i^4} \qquad (3)$$

In some embodiments, for different operations 504, the associated subset of parameters 410 may have overlap on the parameters to be derived. One or more parameters are derived or updated in multiple operations 504. For example, a model parameter 410S (FIG. 5) is successively and iteratively determined in two operations 504-1 and 504-2.

In some embodiments, the plurality of operations 504 may be implemented by multiple operation rounds 502 in each of which all or less than all of the operations 504 are performed. In some embodiments, a second operation round 502-2 repeats operations 504 implemented in a first operation round 502-1.

In some embodiments, different parameters derivation methods 506P can be applied for different operations 504. Examples of parameter derivation methods 506P include, but are not limited to, a least mean square method and parameter calculation using close-form formula. In some embodiments, the parameter derivation method employed in different operations 504 is the same among multiple operations 504. For example, the least mean square method is applied in both the first operation 504-1 of determining the first subset of model parameters 410-1 and the second operation 504-2 of determining the second subset of model parameters 410-2.

In some embodiments, the parameter derivation method employed in at least one of the plurality of operations 504 is the same as that in the implicit or explicit CfL prediction (e.g., of the first coding block 406-1 in FIG. 4), where only one or two parameters need to be derived.

In some embodiments, for different operations 504, the associated subset of parameters may include different number of parameters. For example, the plurality of model parameters 410 has five model parameters in total. The first operation 504-1 determines two model parameters, and the second operation 504-2 determines the remaining three model parameters.

In some embodiments, after a plurality of operations 504 are implemented to determine the plurality of model parameters, a refinement operation 508 is performed to tune the plurality of model parameters 410 jointly and determine their respective final values. For example, the plurality of model parameters 410 has five model parameters in total. The first operation 504-1 determines two model parameters, and the second operation 504-2 determines the remaining three model parameters. In the refinement operation 508, the five model parameters are tuned jointly to determine the values of these five model parameters used to determine the first chroma sample 402A.

In some embodiments, an N-th operation of the plurality of operations 504 is performed to determine a subset of model parameters, where N is equal to 2 or above. The model parameters 410 derived in a subset of one or more previous (N−1) operations 504 are used to derive the subset of model parameters associated with the N-th operation. For example, a total number of model parameters is equal to Num+3. In the first operation 504-1, the model parameter $w_P$ for the offset term B is determined. The remaining (Num+2) model parameters include Num+1 linear model parameters $w_i$ and a nonlinear model parameter $w_P$. In the second operation 504-2, the remaining model parameters are derived using reference luma samples 404R and reference chroma samples 402A in the reference area 412. For example, a reference chroma sample 402A is subtracted by a term $w_B B$, and a difference of the first chroma sample 402A and the term $w_B B$ is predicted according to the following model:

$$predChromaVal - w_B \cdot B = \sum_{i=0}^{Num} w_i \cdot S_i + w_p \cdot P \qquad (4)$$

The model parameters to be derived for equation (4) is reduce by 1 compared with equation (1).

In some embodiments, the plurality of operations 504 applied to determine a total number (N) of model parameters 410 include total number (M) of operations M operations 504 to derive the Num parameters, where M is smaller than N. In each of the plurality of operations 504, a number (K) of parameters can be derived, where K is a positive integer equal to or smaller than M.

In some embodiments, a multi-hypothesis cross-component prediction method that split the Num parameter into several small models are proposed. The plurality of model parameters 410 used in the MH-CCP mode are split into a plurality of groups of model parameters (e.g., 410A and 410B) corresponding to a plurality of smaller MH-CCP models. For example, the plurality of model parameters 410 include five model parameters, and Num in equation (1) is equal to 2. Two smaller MH-CCP models are calculated separately. One model includes three model parameters, and the other model includes two model parameters. After all of the plurality of model parameters 410 are determined from the two smaller MH-CCP models, the plurality of model parameters 410 are normalized and combined to predict the first chroma sample 402A.

Although FIG. 7 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 700 is implemented for decoding video data. The method 700 includes receiving a video bitstream including a current coding block of a current image frame, where the video bitstream includes a syntax element for a multi-hypothesis cross-component prediction (MH-CCP) mode; based on the syntax element, determining whether the MH-CCP mode is enabled to reconstruct a first chroma sample of the current coding block by combining a set of luma samples including a first luma sample based on a model having a plurality of model parameters, the first luma sample collocated with the first chroma sample; and when the syntax element indicates that the MH-CCP mode is enabled: determining a first subset of model parameters used in the MH-CCP mode for the current coding block; after determining the first subset of model parameters, determining a second subset of model parameters used in the MH-CCP mode for the current coding block; identifying a set of neighboring luma samples of the first luma sample; and combining the first luma sample and the set of neighboring luma samples using the plurality of model parameters to generate the first chroma sample; and reconstructing the current coding block including the first chroma sample.

(A2) In some embodiments of A1, the method 700 further includes while determining the first subset of model parameters: setting a remaining model parameter distinct from the first subset of model parameters to a predefined parameter value.

(A3) In some embodiments of A2, the predefined parameter value is equal to 0 or determined based on sample values of a reference coding block.

(A4) In some embodiments of any of A1-A3, the method 700 further includes while determining the second subset of model parameters: setting a remaining model parameter distinct from the second subset of model parameters to a predefined parameter value.

(A5) In some embodiments of A4, the predefined parameter value is equal to 0 or determined based on sample values of a reference coding block.

(A6) In some embodiments of any of A1-A5, the first subset of model parameters include a model parameter of an offset term B, and a DC value of a set of reference luma samples of a reference area and a DC value of a set of reference chroma samples of the reference area are applied to determine the model parameter of the offset term B, the set of reference chroma samples collocated with the set of reference luma samples.

(A7) In some embodiments of any of A1-A6, the first subset of model parameters include a model parameter of an offset term B, and the second subset of model parameters include a model parameter of a non-linear term P, and where determining the second subset of model parameters further includes: determining the model parameter of the non-linear term P based on the offset term B.

(A8) In some embodiments of any of A1-A7, the second subset of model parameters include a model parameter $w_P$ of a non-linear term P, and the model parameter $w_P$ of the non-linear term P is determined to minimize $f(x)$ as follows:

$$\min_x f(x) = \sum_{j=0}^{RefN} (w_p \cdot P_j - y_j)^2$$

where $y_j$ represents each of a set of reference chroma samples of a reference area, and $P_j$ represents a non-linear term of one or more respective reference luma samples corresponding to the respective reference chroma sample of the reference area. (A) In some embodiments of any of A1-A, the second subset of model parameters includes at least one of the first subset of model parameters, and the at least one of the first subset of model parameters is iteratively determined.

(A9) In some embodiments of any of A1-A8, the method 700 further includes when the syntax element indicates that the MH-CCP mode is enabled, implementing a plurality of operation rounds for determining the plurality of model parameters; where each operation round includes a respective subset of a plurality of predefined operations, and each predefined operation includes determining a respective subset of model parameters; where the plurality of predefined operations include determining the first subset of model parameters and determining the second subset of model parameters.

(A11) In some embodiments of any of A1-A10, the first subset of model parameters are determined based on a first parameter derivation method, and the second subset of model parameters are determined based on a second parameter derivation method distinct from the first parameter derivation method.

(A12) In some embodiments of A11, the first parameter derivation method is a least mean square method, and the second parameter derivation method is a close-form formula based method.

(A13) In some embodiments of any of A1-A10, both the first subset of model parameters and the second subset of model parameters are determined based on a common parameter derivation method.

(A14) In some embodiments of any of A1-A13, the current image frame include a first coding block distinct from the current coding block, and the first coding block is reconstructed according to a chroma from luma (CfL) prediction mode associated with a CfL parameter derivation method, and the first subset of model parameters or the second subset of model parameters are determined based on the CfL parameter derivation method.

(A15) In some embodiments of any of A1-A14, the first subset of model parameters include a first number of model parameters, and the second subset of model parameters include a second number of model parameters, the second number different from the first number.

(A16) In some embodiments of any of A1-A15, the method 700 further includes, before using the plurality of model parameters, refining the plurality of model parameters including the first subset of model parameters and the second subset of model parameters jointly.

(A17) In some embodiments of any of A1-A16, after the first subset of model parameters is determined, the first subset of model parameters is applied to determine the second subset of model parameters used in the MH-CCP mode for the current coding block.

(A18) In some embodiments of any of A1-A17, an ordered sequence of operations is implemented to determine the plurality of model parameters and includes at least determining the first subset of model parameters and determining the second subset of model parameters, a total number (M) of operations in the ordered sequence of operations being less than a total number (N) of model parameters of the plurality of model parameters.

(A19) In some embodiments of any of A1-A18, the plurality of model parameters are split into a first group of model parameters and a second group of model parameters, further including: separately determining the first group of model parameters and the second group of model parameters, where the first group of model parameters includes the first subset of model parameters and the second subset of model parameters; and normalizing the first group of model parameters and the second group of model parameters before using the plurality of model parameters.

(A20) In some embodiments, a method for video encoding is provided. The method includes receiving video data including a current coding block of a current image frame; encoding the current image frame; transmitting the encoded current image frame via a video bitstream; and signaling, via the video bitstream, a syntax element for a multi-hypothesis cross-component prediction (MH-CCP) mode, indicating whether to reconstruct a first chroma sample of the current coding block combining a set of luma samples including a first luma sample based on a model having a plurality of model parameters, the first luma sample collocated with the first chroma sample; where when the MH-CCP mode is enabled, a first subset of model parameters and a second subset of model parameters are sequentially determined for use in the MH-CCP mode for reconstructing the current coding block.

(A21) In some embodiments of A21, the method is implemented to enable the features of any of A2-A19.

(A22) In some embodiments, a method for video encoding is provided. The method includes obtaining a source video sequence including a current image frame having a current coding block; and performing a conversion between the source video sequence and a video bitstream, where the video bitstream includes: the current image frame having the current coding block; and a syntax element for a multi-hypothesis cross-component prediction (MH-CCP) mode, indicating whether to reconstruct a first chroma sample of the current coding block combining a set of luma samples including a first luma sample based on a model having a plurality of model parameters, the first luma sample collocated with the first chroma sample; where when the MH-CCP mode is enabled, a first subset of model parameters and a second subset of model parameters are sequentially determined for use in the MH-CCP mode for reconstructing the current coding block.

(A23) In some embodiments of A22, the method is implemented to enable the features of any of A2-A19.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A23 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A23 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:

receiving a video bitstream including a current coding block of a current image frame, wherein the video bitstream includes a syntax element for a multi-hypothesis cross-component prediction (MH-CCP) mode;

based on the syntax element, determining whether the MH-CCP mode is enabled to reconstruct a first chroma sample of the current coding block by combining a set of luma samples including a first luma sample based on a model having a plurality of model parameters, the first luma sample collocated with the first chroma sample;

when the syntax element indicates that the MH-CCP mode is enabled:

determining a first subset of model parameters used in the MH-CCP mode for the current coding block;

after determining the first subset of model parameters, determining a second subset of model parameters used in the MH-CCP mode for the current coding block;

identifying a set of neighboring luma samples of the first luma sample; and combining the first luma sample and the set of neighboring luma samples using the plurality of model parameters to generate the first chroma sample; and reconstructing the current coding block including the first chroma sample.

2. The method of claim 1, further comprising, while determining the first subset of model parameters:

setting a remaining model parameter distinct from the first subset of model parameters to a predefined parameter value.

3. The method of claim 2, wherein the predefined parameter value is equal to 0 or determined based on sample values of a reference coding block.

4. The method of claim 1, further comprising, while determining the second subset of model parameters:

setting a remaining model parameter distinct from the second subset of model parameters to a predefined parameter value.

5. The method of claim 4, wherein the predefined parameter value is equal to 0 or determined based on sample values of a reference coding block.

6. The method of claim 1, wherein the first subset of model parameters include a model parameter of an offset term B, and a DC value of a set of reference luma samples of a reference area and a DC value of a set of reference chroma samples of the reference area are applied to determine the model parameter of the offset term B, the set of reference chroma samples collocated with the set of reference luma samples.

7. The method of claim 1, wherein the first subset of model parameters include a model parameter of an offset term B, and the second subset of model parameters include a model parameter of a non-linear term P, and wherein determining the second subset of model parameters further comprises:

determining the model parameter of the non-linear term P based on the offset term B.

8. The method of claim 1, wherein the second subset of model parameters include a model parameter $w_P$ of a non-linear term P, and the model parameter $w_P$ of the non-linear term P is determined to minimize f(x) as follows:

$$\min_x f(x) = \sum_{j=0}^{RefN} (w_p \cdot P_j - y_j)^2$$

where $y_j$ represents each of a set of reference chroma samples of a reference area, and $P_j$ represents a non-linear term of one or more respective reference luma samples corresponding to the respective reference chroma sample of the reference area.

9. The method of claim 1, wherein the second subset of model parameters includes at least one of the first subset of model parameters, and the at least one of the first subset of model parameters is iteratively determined.

10. The method of claim 1, further comprising, when the syntax element indicates that the MH-CCP mode is enabled, implementing a plurality of operation rounds for determining the plurality of model parameters;

wherein each operation round includes a respective subset of a plurality of predefined operations, and each predefined operation includes determining a respective subset of model parameters;

wherein the plurality of predefined operations include determining the first subset of model parameters and determining the second subset of model parameters.

11. The method of claim 1, wherein the first subset of model parameters are determined based on a first parameter derivation method, and the second subset of model parameters are determined based on a second parameter derivation method distinct from the first parameter derivation method.

12. The method of claim 11, wherein the first parameter derivation method is a least mean square method, and the second parameter derivation method is a close-form formula based method.

13. The method of claim 1, wherein both the first subset of model parameters and the second subset of model parameters are determined based on a common parameter derivation method.

14. The method of claim 1, wherein the current image frame include a first coding block distinct from the current coding block, and the first coding block is reconstructed according to a chroma from luma (CfL) prediction mode associated with a CfL parameter derivation method, and the first subset of model parameters or the second subset of model parameters are determined based on the CfL parameter derivation method.

15. The method of claim 1, wherein the first subset of model parameters include a first number of model parameters, and the second subset of model parameters include a second number of model parameters, the second number different from the first number.

16. The method of claim 1, further comprising:

before using the plurality of model parameters, refining the plurality of model parameters including the first subset of model parameters and the second subset of model parameters jointly.

17. The method of claim 1, wherein after the first subset of model parameters is determined, the first subset of model parameters is applied to determine the second subset of model parameters used in the MH-CCP mode for the current coding block.

18. The method of claim 1, wherein an ordered sequence of operations is implemented to determine the plurality of model parameters and includes at least determining the first subset of model parameters and determining the second subset of model parameters, a total number (M) of operations in the ordered sequence of operations being less than a total number (N) of model parameters of the plurality of model parameters.

19. The method of claim 1, wherein the plurality of model parameters are split into a first group of model parameters and a second group of model parameters, further comprising:

separately determining the first group of model parameters and the second group of model parameters, wherein the first group of model parameters includes the first subset of model parameters and the second subset of model parameters; and normalizing the first group of model parameters and the second group of model parameters before using the plurality of model parameters.

20. A computing system, comprising:

control circuitry; and memory storing one or more programs configured to be executed by the control circuitry, the one or more programs further comprising instructions for:

receiving video data comprising a current coding block of a current image frame;

encoding the current image frame;

transmitting the encoded current image frame via a video bitstream; and signaling, via the video bitstream, a syntax element for a multi-hypothesis cross-component prediction (MH-CCP) mode, indicating whether to reconstruct a first chroma sample of the current coding block combining a set of luma samples including a first luma sample based on a model having a plurality of model parameters, the first luma sample collocated with the first chroma sample;

wherein when the MH-CCP mode is enabled, a first subset of model parameters and a second subset of model parameters are sequentially determined for use in the MH-CCP mode for reconstructing the current coding block.

21. A non-transitory computer-readable storage medium storing one or more programs for execution by control circuitry of a computing system, the one or more programs comprising instructions for:

obtaining a source video sequence including a current image frame having a current coding block; and performing a conversion between the source video sequence and a video bitstream, wherein the video bitstream comprises:

the current image frame having the current coding block; and a syntax element for a multi-hypothesis cross-component prediction (MH-CCP) mode, indicating whether to reconstruct a first chroma sample of the current coding block combining a set of luma samples including a first luma sample based on a model having a plurality of model parameters, the first luma sample collocated with the first chroma sample;

wherein when the MH-CCP mode is enabled, a first subset of model parameters and a second subset of model parameters are sequentially determined for use in the MH-CCP mode for reconstructing the current coding block.

\* \* \* \* \*